Figure 1:
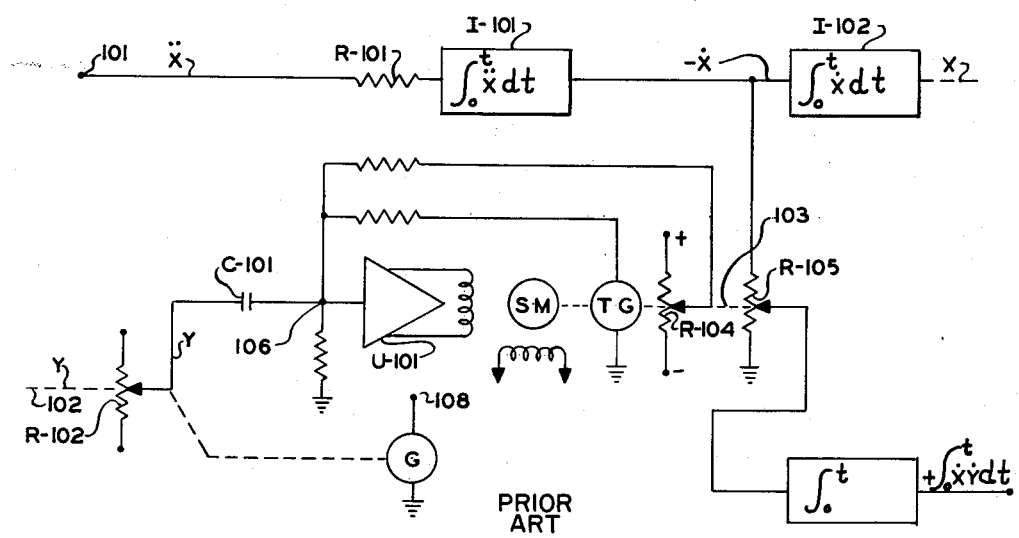

Jan. 3, 1961   L. E. FOGARTY   2,967,018
ANALOG COMPUTATION
Filed Jan. 4, 1957

LAURENCE E. FOGARTY
INVENTOR

BY Darby + Darby
ATTORNEY under# United States Patent Office 2,967,018
Patented Jan. 3, 1961

2,967,018

ANALOG COMPUTATION

Laurence E. Fogarty, Binghamton, N.Y., assignor to General Precision Inc., a corporation of Delaware Filed Jan. 4, 1957, Ser. No. 632,481

2 Claims. (Cl. 235—183)

This invention relates to analog computer apparatus, and, more specifically, to improved method and means for computing the product of two time-varying indeptent variables. In the analog computer, automatic control and instrumentation arts, the analog simulator art being a notable example, many computer systems are required to solve equations so as to provide analog computer quantities which are the product of two time-varying computer quantities. If certain computing elements in an involved analog computer introduces errors or "noise" such limitations adversely affect the operation and stability of the entire computer. Thus it is desirable that every mathematical operation performed in an analog computer be performed with as little error and noise as is possible.

A number of differential equations expressing the operation of various physical systems require computation of the time integral of the product of two or more time-varying quantities, where one of the quantities and its time derivative may be available in the computer as voltages, but where only the time integral of the other quantity may be available, perhaps as a shaft position. The most common prior art manner of solving the problem has been that of differentiating the shaft-position second quantity with respect to time, multiplying the two quantities, and then integrating the product with respect to time to provide the desired answer quantity. Due to the limitations of various contemporary electrical analog computer apparatus, a number of undesirable effects attend such a method, and some of these limitations of the prior art will be pointed out below more specifically. The invention, on the other hand, entirely avoids the undesirable step of differentiating the shaft position with respect to time, and also provides the desired output quantity with simpler and more accurate apparatus.

Thus it is a primary object of the present invention to provide improved method and means for providing an analog potential commensurate with the product of two time-varying input potentials.

It is a more specific object of the invention to provide improved method and means for providing an analog potential commensurate with the time integral of the product of two time-variables, where the time derivative of one of the variables is available as an electrical analog and where the time integral of the other of said variables is available as a mechanical analog.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

Figure 2:
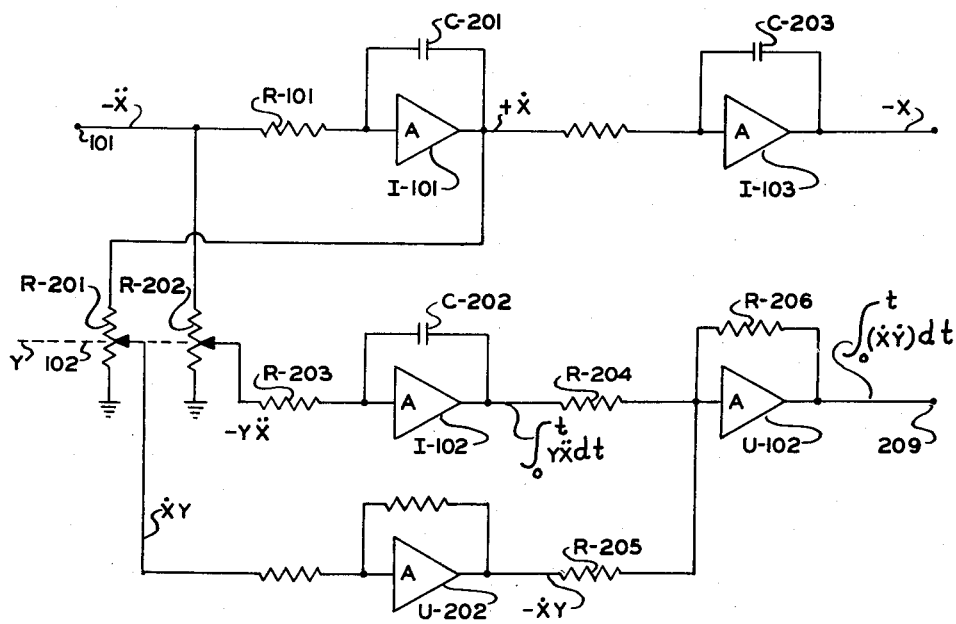

For a fuller understanding of the nature and objects of the invention reference should be had to the following detailed description taken in connection with the accompanying drawings, in which:

Fig. 1 is an electrical schematic diagram illustrating common prior art apparatus for computing the time integral of the product of two time-variables; and Fig. 2 is an electrical schematic diagram illustrating the preferred embodiment of the invention. In both figures, well known analog computer elements are shown in symbol form for sake of clarity, and like numerals refer to similar parts.

Referring now to Fig. 1, there is shown typical prior art apparatus for solving the problem mentioned above. An electrical quantity $\ddot{x}$ derived by other apparatus not shown exists at terminal 101. This voltage may vary with time in magnitude and polarity in accordance with a physical or numerical quantity it is intended to represent. For example, the quantity $\ddot{x}$ may represent the acceleration, either angular or translational, of a simulated or actual physical member. In order to determine the velocity $\dot{x}$ of such a member, the electrical quantity at terminal 101 is applied through a scaling resistor R–101 to an integrating means I–101 shown in block form. Integrator I–101, which may comprise any one of the many well known analog computer integrators, such as a velocity servo or Miller integrator, integrates the $\ddot{x}$ quantity with respect to time to provide an output quantity commensurate with $\dot{x}$, the velocity of the member. The $\dot{x}$ quantity may be applied to a further integrating means indicated by integrator I–102 in Fig. 1, to provide an output quantity commensurate with the position of the member. A vast number of analog computers solve second order differential equations in which such successive integrations are made in order to simulate the operation of physical systems. The dashed line at the right-hand side of the integrator block indicates that integrator I–102 provides a mechanical output position. Generally speaking, if only an electrical output quantity is needed from integrator I–102, an all-electronic integrator will be preferred because of its considerably better accuracy and frequency response.

In Fig. 1 the problem which arises is the computation of the quantity $\int_0^t (\dot{x}\dot{y}) dt$, where the quantity $\dot{y}$ is available neither as a voltage nor a shaft position, but where the time integral quantity $y$ is available as a shaft position, as illustrated by the provision of shaft 102 in Fig. 1. In order to provide the desired product for either electronic or electro-mechanical integration, the prior art has differentiated the quantity represented by the shaft position and then multiplied the two quantities. For example, the prior art manner of attacking the problem may utilize a resistor-capacitor differentiating circuit such as shown in Fig. 1. Potentiometer R–102 has its winding excited by constant potentials from the computer power supply (not shown), and its wiper arm positioned in accordance with the quantity $y$ by the position of available shaft 102. The potential commensurate with the quantity $y$ appearing on the arm of the potentiometer is routed to a conventional resistance-capacitance differentiating circuit comprised of capacitor C–101 and resistance R–103. The output of the differentiating circuit is shown connected to the input terminal of a conventional analog computer position servo. The input voltage to the servo is amplified by amplifier U–101 and applied to drive a conventional servo motive means SM, which mechanically drives a tachometer generator TG and a rebalancing or follow-up potentiometer R–104. The servo motor SM drives the servo output shaft 103 to a position commensurate with the differentiated $y$, or $\dot{y}$, potential applied to the servo, and tachometer TG is provided to minimize, as much as possible, tendencies of the servo to overshoot or hunt. Assuming that the position servo accurately coverts the $y$ shaft position into a $\dot{y}$ shaft position at shaft 103, multiplication of the $x$ and $\dot{y}$ quantities is easily accomplished, merely by exciting a potentiometer R-105 on shaft 103 with the $\ddot{x}$ voltage from terminal 101. The $xy$ voltages on the arm of potentiometers R-105 then may be integrated either electronically or electromechanically to provide the desired integral of the product, $\int_0^t \ddot{x}\dot{y}\,dt$.

Potentiometer R-102 will have finite resolution, however, so that the $y$ shaft position will not be converted smoothly into a $y$ voltage on the arm of potentiometer R-102. Instead, as shaft 102 is rotated, the voltage on the arm of potentiometer R-102 will increase or decrease in a series of small but sudden steps. When such a $y$ voltage is differentiated, such as by the RC differentiating circuit shown, the $\dot{y}$ voltage will contain sharp spikes having amplitudes which may completely obscure the actual value of the $\dot{y}$ voltage. Such spikes will cause the position servo to operate wildly unless the servo is damped to such an extent that it is far too slow in following the $\dot{y}$ voltage. Hence the use of a differentiated potentiometer output voltage to position a position servo to convert the $y$ shaft position to a $\dot{y}$ shaft position is entirely unacceptable.

It has been well known in the prior art for a considerable time that it is inadvisable to differentiate the output voltage from a potentiometer, and hence various other means for providing a derivative of the $y$ shaft position have been used. A very common alternative is the use of a tachometer generator, such as shown at G in Fig. 1, driven by the $y$ shaft. Tachometer generator G provides a much smoother $\dot{y}$ voltage than the potentiometer-RC differentiator combination shown, so that connection of generator output terminal 108 to the servo input terminal 106 in place of the $\dot{y}$ signal shown applied via capacitor C-101 will, in general, provide improved operation. However, tachometer generators have finite inductance and limited sensitivity at low speeds, so that the $\dot{y}$ voltage supplied to the position servo from generator G is liable to be in error, either statically, dynamically, or both. And finally, regardless of how the differentiation of the $y$ shaft position is done, the position servo utilized to convert the $\dot{y}$ voltage into a $\dot{y}$ shaft position inherently has limited frequency response and appreciable velocity lag, so that the instantaneous position of shaft 103 is liable to be inaccurate. In spite of the numerous inaccuracies of the prior art methods and apparatus, the absence of improved method and apparatus has required use of the former, often to the considerable detriment of overall computer operation.

Referring now to Fig. 2, there is shown an exemplary embodiment of the present invention, with well known parts shown in symbol form. The $\ddot{x}$ input potential at terminal 101 is applied via scaling resistor R-101 to an electronic integrator I-101 shown as comprising a conventional operational amplifier having a capacitor C-201 connected in its feedback circuit. Electronic integrator I-101 integrates the $\ddot{x}$ voltage with respect to time, providing an $\dot{x}$ output voltage in extremely accurate manner, since electronic integrators, as is well known, are not plagued by the friction, hysteresis, blacklash and inertia limitations of electromechanical integrators. The $\dot{x}$ voltage may be integrated again by means of electronic integrator I-103 if an output voltage commensurate with the variable $x$ is desired. If the quantity $x$ is required as a shaft position elsewhere in the computer, any conventional position servo may be connected to the output circuit of integrator I-103 to furnish the $x$ quantity in mechanical form.

The $\dot{x}$ quantity output voltage from electronic integrator I-101 is applied to excite potentiometer R-201 the arm of which is positioned by the $y$-input shaft 102, thereby deriving a potential commensurate with the product $\dot{x}y$. As shown in Fig. 2, such product potential is applied via summing resistor R-205 to a summing device shown as comprising a conventional analog computer summing amplifier U-102. The $\ddot{x}$ input potential from terminal 101 also is applied to excite a further potentiometer, R-202, the arm of which also is positioned by the $y$ variable input shaft. The potential on the arm of potentiometer R-202, which potential is commensurate with the quantity $y\ddot{x}$, is applied via scaling resistor R-203 to a second electronic integrator I-102, which integrator provides an output potential commensurate with the quantity $\int_0^t y\ddot{x}\,dt$. Such output potential is applied via summing resistor R-204 of the summing device. As will now be explained, the output of the summing device is the desired product quantity, and it will be apparent at this point, that the desired product quantity has been obtained without differentiating by the $y$ input quantity.

By definition:
$$x = \int_0^t \dot{x}\,dt = \int_0^t \int_0^t \ddot{x}\,dt\,dt$$
and
$$y = \int_0^t \dot{y}\,dt = \int_0^t \int_0^t \ddot{y}\,dt\,dt$$

The differential of a product ($uv$) may be written as follows:
$$d(uv) = u\,dv + v\,du$$
Transposing,
$$u\,dv = d(uv) - v\,du$$
Integrating,
$$\int u\,dv = uv - \int v\,du$$
Substituting
$$\frac{dx}{dt}$$
for $u$, and also substituting $y$ for $v$ in the above expression,
$$\int \frac{dx}{dt}\,dv = \frac{dx}{dt}y - \int y\,du$$
If
$$\frac{dx}{dt} = u \text{ then } du = \frac{d^2x}{dt^2}$$
and if $y = v$ then
$$dv = \frac{dy}{dt}\,dt$$
Substituting further into the above expression:
$$\int \frac{dx}{dt}\frac{dy}{dt}\,dt = \frac{dx}{dt}y - \int y\frac{d^2x}{dt^2}$$
which written with dot notation for time derivatives provides:
$$\int_0^t \dot{x}\dot{y}\,dt = \dot{x}y - \int_0^t y\ddot{x}\,dt$$

As shown in Fig. 2, the two quantities applied to summing amplifier U-102 are commensurate with the two terms on the right-hand side of the above expression, the $\dot{x}y$ term being applied via resistor R-205 and $\int_0^t y\ddot{x}\,dt$ term being applied via resistor R-206. As indicated by the analysis above, the sum of these two potentials provides the desired integral of the product without differentiation.

A typical application of the invention may now be considered. In an analog computer such as a flight simulator or a flight table it may be desirable to compute simulated altitude $h$ of a simulated aircraft or missile, utilizing the formula:
$$h = \int_0^t V \sin \gamma\,dt$$
wherein
$V$ = velocity along the flight path
$\gamma$ = flight path elevation angle If an input potential commensurate with cos $\gamma\dot{\gamma}$ is applied to terminal 101 in Fig. 2, and a shaft position mechanical input commensurate with $\int_0^t \gamma\,dt$, which may be called $\delta$ is applied at 102, an output potential commensurate with altitude will be derived at terminal 209. Conversely, if an input potential commensurate with sin $\gamma\dot{\gamma}$ is applied to terminal 101, an output potential commensurate with horizontal distance will be derived at terminal 209. The cos $\gamma$, sin $\gamma$, $\dot\gamma$ and $\delta$ quantities are frequently available in desired form in a number of contemporary computers. Numerous further applications of the invention to other computations will become readily apparent to those skilled in the art in light of this disclosure.

While Fig. 2 shows a single embodiment of the invention, those skilled in the art will recognize that various equivalent computer techniques may be substituted. As examples, series summing of voltages may be substituted for the parallel addition arrangement shown, and various forms of potential modifying means may be utilized in lieu of the simple potentiometers shown.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Analog computing apparatus for providing an output potential commensurate with the time integral of the product of two independent quantities which vary with time comprising in combination, means for deriving an input potential commensurate with the time rate of change of one of said quantities, integrator means responsive to said input potential for deriving a second potential commensurate with said one of said quantities, a mechanical shaft position input device having a position commensurate with the time integral of the second of said two quantities, first potentiometer means operated by said mechanical input device for modifying said input potential to provide a third potential, second potentiometer means operated by said mechanical input device for modifying said second potential to provide a fourth potential, means for integrating said third potential with respect to time to provide a fifth potential commensurate with the time integral of said third potential, and means for combining said fourth and fifth potentials to provide said output potential.

2. Electrical analog computing apparatus for providing an output voltage commensurate with the time integral of the product of two independent variables comprising in combination, electronic integrator means responsive to an input potential commensurate with rate of change of a first of said variables for providing a first potential, a pair of potential modifying means operable by a mechanical input device for modifying said input and first potentials in accordance with the time integral of the second of said variables to provide second and third potentials, electronic integrator means for integrating said second potential with respect to time to provide a fourth potential, and electrical summing means responsive to said third and fourth potentials to provide said output potential.

References Cited in the file of this patent

Electronic Instruments (Greenwood et al.), 1948, p. 131–134.

Electrontube Circuits (Seely), 1950, p. 165.

Project Cyclone, part 2 (Murphy), 1952, pages 43 and 50.

The University of Connecticut Engineering Experiment Station (Robb), pages 4–7, 1953.

A Palimpsest on the Electric Analog Art (Paynter, Editor), 1955, pages 141–145.